United States Patent [19]

Armstrong

[11] 4,275,881
[45] Jun. 30, 1981

[54] TILT POLE

[76] Inventor: W. Ted Armstrong, P.O. Box 40962, San Francisco, Calif. 94140

[21] Appl. No.: 71,832

[22] Filed: Sep. 4, 1979

[51] Int. Cl.³ .................... A63B 25/04; A63G 31/08
[52] U.S. Cl. ................................. 272/114; 280/1.182; 280/218
[58] Field of Search .............. 272/28 R, 33 R, 33 A, 272/54, 55, 70, 70.1, 85, 93, 109, 110, 111, 112, 113, 114, 116, 142, 146; 280/1.175, 1.177, 1.181–1.183, 1.184, 1.191, 1.195, 205, 218–220

[56] References Cited

U.S. PATENT DOCUMENTS

| | | | |
|---|---|---|---|
| 1,273,290 | 7/1918 | Van Aken | 280/1.184 X |
| 1,617,665 | 2/1927 | Cashoty | 272/114 X |
| 2,017,213 | 10/1935 | Laborda | 272/114 X |
| 2,635,886 | 4/1953 | Schoebel | 280/1.183 |
| 2,651,527 | 9/1953 | Thoren | 280/218 |
| 2,726,845 | 12/1955 | Hyslop et al. | 272/56 X |
| 2,862,710 | 12/1958 | Lewis | 272/33 A |
| 2,920,890 | 1/1960 | Nawara | 272/55 X |
| 2,999,688 | 9/1961 | Gabrielson | 272/56 X |
| 3,096,990 | 7/1963 | Thoren | 280/1.184 X |
| 3,268,223 | 8/1966 | Woodsum | 272/110 X |
| 3,423,105 | 1/1969 | Kerstholt et al. | 280/1.182 X |

FOREIGN PATENT DOCUMENTS

| | | | |
|---|---|---|---|
| 227571 | 10/1910 | Fed. Rep. of Germany | 272/146 |
| 377731 | 6/1923 | Fed. Rep. of Germany | 272/114 |
| 2504626 | 8/1976 | Fed. Rep. of Germany | 272/110 |
| 483209 | 3/1917 | France | 280/1.182 |
| 570276 | 1/1924 | France | 280/1.182 |

*Primary Examiner*—Richard J. Apley

[57] ABSTRACT

This device is an amusement and exercise device, which consists primarily of a base, upon which the user stands while grasping a fixed center pole of the base to effect a rocking motion. It further includes three spaced-apart wheels on spring-loaded legs, and three other legs that function as pivot points.

3 Claims, 3 Drawing Figures

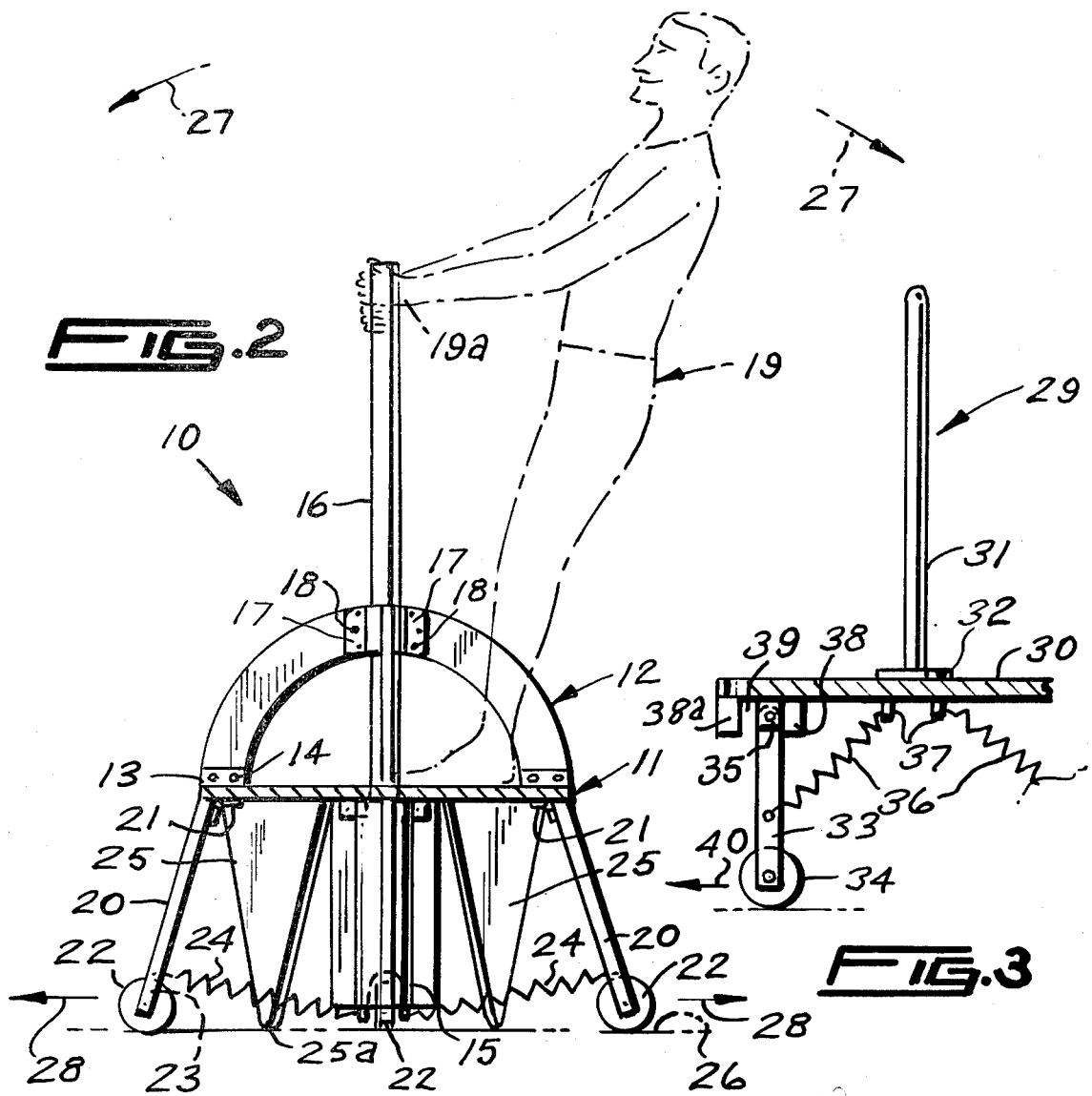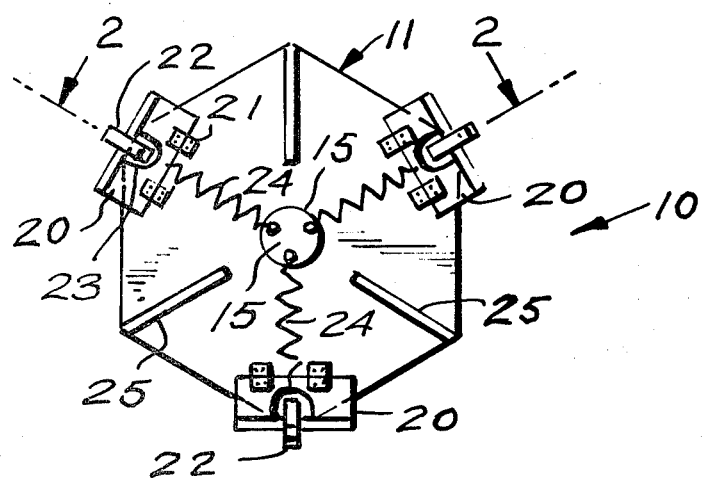

TILT POLE

This invention relates to exercise devices, and more particularly, to a tilt pole device.

It is, therefore, the principal object of this invention to provide a tilt pole device, which will be a combination amusement and exercise unit.

Another object of this invention is to provide a tilt pole device, which will have a plurality of spring-loaded legs with wheels, that will move towards, and away from, the center of the base of the device when in use.

A further object of this invention is to provide a tilt pole device, which will have a center post, for serving as handle grip means, so as to enable the user to shift his or her weight, to effect a rocking motion of the device.

Other objects of the invention are to provide a tilt pole device, which will be simple in design, inexpensive to manufacture, rugged in construction, and easy to use.

These, and other objects of the invention, will become readily evident, upon a study of the specification, and the accompanying drawing in which:

FIG. 1 is a bottom plan view of the present invention;

FIG. 2 is a cross-sectional view, taken along the line 2—2 of FIG. 1, and shows a human figure in phantom lines, and FIG. 3 is fragmentary view similar to FIG. 2, but shows a modified form of the invention, which includes normally vertical wheels on legs, that will move outwards against a stop member on the bottom of the device, when it is being used.

According to this invention, device 10 is shown to include a hexagonal base 11, to which is fixedly secured a semi-circular member 12, at its top, by means of a pair of brackets 13, receiving suitable fasteners 14. A pole 15 is fixedly secured to the bottom of base 11, in a suitable manner, and its upper portion 16 extends through the center of base 11, and is fixedly secured to the center of member 12, by a pair of brackets 17 (one of which is shown), by means of a plurality of fasteners 13.

As is shown in FIG. 1, the user 19 stands on the base member 12, and grips the upper portion 16 of pole 15 with his or her hands 19a, and shifts the body weight to effect a rocking motion in three directions, which will be more fully described hereinafter.

Three equally spaced-apart and pivotal legs 20 are secured to the bottom of base 11, by means of a hinge 21, and a wheel 22 is freely and rotatably received in an opening 23 included in each leg 20. A coil spring 24 is fixedly secured, at one end, to each leg 20, and is fixedly secured, at its opposite end, to the bottom of pole 15, so as to impart a controlled extending and return of legs 20, when device 10 is in use. A plurality of radially spaced apart legs 25 are fixedly secured to the bottom of base 11, between legs 20, and the bottom portions 25a serve as pivot means on ground 26.

When in operation, the user 19 initiates motion by displacing his weight as is indicated by the arrows 27, and when doing so, the result is expansion of springs 24, which causes legs 20 to roll on wheels 22, as indicated by the arrows 28, and the legs 25 function as stand means and pivot point means on the ground 26.

Referring now to FIG. 3 of the drawing, a modified device 29 includes a base 30, which has a center pole 31 secured fixedly to its top, by its flange 32. Three equally spaced-apart and pivotal legs 33, having a wheel 34 each, are pivotally secured within a bracket 35, that is fixedly secured to the bottom of base 30. A coil spring 36 is fixedly secured, at one end, to each leg 33 and is fixedly secured at its opposite end to a lug 37 fixedly secured to the bottom of base 30, and springs 36 operate in the same aforementioned manner as springs 24 of device 10. A projection 38 is fixedly secured on the bottom of base 30, and provides stop means against travel of its adjacent leg 33 towards the center of base 30, and a similar projection 38a is spaced apart from each leg 33 on base 30, as indicated by the numerical character 39, and serves as stop limit means against outward pivotal travel of its corresponding leg 33.

When the user 19 positions himself on top of base 30, and grasps the pole 31, he or she uses the same motion as was described of device 10, to cause motion in three directions, one of which is indicated by the arrow 40.

While various changes may be made in the detail structure, such changes will be within the spirit and scope of the present invention, as is defined in the appended claims.

What I now claim is:

1. A tilt pole device, comprising, in combination, a flat base, a plurality of legs with wheels that are three in number, are equally and radially spaced apart from the vertical center axis through the top and underside faces of said flat base, said legs with wheels being in engagement with the ground at one end and are hinged to the underside of said flat base at their opposite ends by a hinge, and are urged inwards toward said vertical axis in said flat base by spring means, said spring means providing the shifting of said flat base from its horizontal plane, when the user mounted upon said flat base imparts a rocking motion to said flat base omnidirectionally by shifting their weight similarly, while gripping a pole fixedly secured at its lower portion to said flat base.

2. The combination according to claim 1, wherein said spring means comprises a coil spring fixedly secured at one end to each of said legs with wheels, and the opposite end is fixedly secured to the bottom end of said pole, and each of said coil springs provides limited outward travel of said plurality of legs with wheels, from said vertical axis through said flat base.

3. The combination according to claim 2, wherein a plurality of fixed legs are equally and radially spaced apart from said vertical axis, and each are spaced between said plurality of legs with wheels, and one end of each is fixedly secured to said underside of said flat base, and the opposite end is narrow and rounded, and serves as support means and pivot point means against a ground surface.

* * * * *